(12) United States Patent
Boughorbel (10) Patent No.: US 8,340,399 B2
(45) Date of Patent: Dec. 25, 2012

(54) METHOD FOR DETERMINING A DEPTH MAP FROM IMAGES, DEVICE FOR DETERMINING A DEPTH MAP

(75) Inventor: Faysal Boughorbel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1136 days.

(21) Appl. No.: 12/282,904

(22) PCT Filed: Mar. 14, 2007

(86) PCT No.: PCT/IB2007/050860
§ 371 (c)(1),
(2), (4) Date: Sep. 15, 2008

(87) PCT Pub. No.: WO2007/105176
PCT Pub. Date: Sep. 20, 2007

(65) Prior Publication Data
US 2009/0080767 A1 Mar. 26, 2009

(30) Foreign Application Priority Data
Mar. 15, 2006 (EP) .................................... 06111163

(51) Int. Cl.
G06K 9/00 (2006.01)
G06K 9/36 (2006.01)
(52) U.S. Cl. .......................................... 382/154; 382/285
(58) Field of Classification Search .................... 382/154
See application file for complete search history.

(56) References Cited

U.S. PATENT DOCUMENTS

| 7,333,651 B1* | 2/2008 | Kim et al. | 382/154 |
| 2002/0110272 A1* | 8/2002 | Brodsky | 382/154 |
| 2003/0169918 A1* | 9/2003 | Sogawa | 382/154 |
| 2004/0105580 A1* | 6/2004 | Hager et al. | 382/154 |

FOREIGN PATENT DOCUMENTS

| EP | 1034512 B1 | 9/2000 |
| EP | 1418766 A2 | 5/2004 |
| WO | 2005091221 A1 | 9/2005 |

OTHER PUBLICATIONS

Fusiello et al., "Efficient Stereo with Multiple Windowing," Jun. 1997, IEEE Computer Vision and Pattern Recognition, 1997 edition, 858-863.*
Perez et al., "A comparison of hardware resources required by real-time stereo dense algorithms," in Proceedings of the 6th IEEE International Workshop on Computer Architectures for Machine Perception, May 2003.*

(Continued)

*Primary Examiner* — Vu Le
*Assistant Examiner* — Kenny Cese (57) ABSTRACT

Window based matching is used for determining a depth map from images obtained from different orientations. A set of fixed matching windows is used for points of the image for which the depth is to be determined. The set of matching windows covers a footprint of pixels around the point of the image, and the average number (O) of matching windows that a pixel of the footprint (FP) belongs to is less than one plus the number of pixels in the footprint divided by 15 (O<FP/15+1), preferably less than one plus the number of pixels in the footprint divided by 25 (O<FP/25+1).

11 Claims, 9 Drawing Sheets

OTHER PUBLICATIONS

Okutomi et al., "A simple stereo algorithm to recover precise object boundaries and smooth surfaces," IEEE Computer Vision and Pattern Recognition, vol. 2, 2001.*

William Hoff, et al: Surfaces from Stereo: Integrating Feature Matching, Disparity Estimation, and Contour Detection, IEEE Transactions on Pattern Analysis and Machine Intelligence. vol. 1 1 . No. 2. Feb. 1989, IEEE, pp. 121-136.

Masatoshi Okutomi, et al: A Simple Stereo Algorithm to Recover Precise Object Boundaries and Smooth Surfaces, Computer Vision and Pattern Recognition 2001, CVPR2001, Proceedings of the 2001 IEEE, Computer Society Conf., vol. 2, pp. II-138 To II-142.

Boughorbel F.: "Multiple Footprint Stereo Algorithms for 3D Display Content Generation" Proceedings of SPIE, vol. 6490, Mar. 5, 2007, XP002466221.

Geiger D et al.: "Occlusions and Binocular Stereo" International Journal of Computer Vision, Kluwer Academic Publishers, Norwell, US, vol. 14, No. 3, Apr. 1, 1995, pp. 211-226, XP000495842.

Perez M et al.: "A Comparison of Hardware Resources Required by Real-Time Stereo Dense Algorithms" Computer Architectures for Machine Perception, 2003 IEEE International Workshop on New Orleans, LA, USA May 12-16, 2003, pp. 299-306, XP010896371.

Yin Li, Heung-Yeung Shum, et al: Stereo Reconstruction from Multiperspective Panoramas, IEEE Transactions on Pattern Analysis and Machine Intelligence, vol. 26, No. 1, Jan. 2004, pp. 45-62.

Ebroul Izquierdo M., : Disparity/Segmentation Analysis: Matching with an Adaptive Window and Depth-Driven Segmentation, IEEE Transactions on Circuits and Systems for Video Technology, vol. 9, No. 4, Jun. 1999, pp. 589-607.

* cited by examiner

METHOD FOR DETERMINING A DEPTH MAP FROM IMAGES, DEVICE FOR DETERMINING A DEPTH MAP

The invention relates to a method for determining a depth map from images obtained from different orientations using window-based matching for a point of the image.

The invention also relates to a device for determining a depth map from images obtained from different orientations using window-based matching for a point of the image.

For a number of applications it is desirable to determine a depth map from images. Examples of such applications include systems that make it possible to compute images of the scene viewed from interactively controllable orientations, image compression, inspection etc. The task of recovering depth maps from stereo imagery is often crucial for a wide range of applications such as 3D displays, quality control at manufacturing, autonomous navigation and object recognition. Herein, depth of a point in an image refers to the distance between the viewpoint and the plane through the point and perpendicular to the optical axis of camera.

When the viewpoint of a camera is moved from a first to a second viewpoint, a depth of an image point can be determined from the amount of translation of the position of the image point. If the image is obtained by point projection, the translation is proportional to the amount of displacement of the camera and inversely proportional to the depth of the part of an image.

It has been known, in order to measure the translation, to use window based matching wherein the pixel values in a window around a pixel in a first image obtained from a first orientation of the camera are compared to the pixel values in a window around a pixel in a second image obtained from a second orientation. Matching usually involves determining an aggregate of the differences between the pixel values of the pixels in the matching windows.

Window based matching methods share a common problem, namely boundary overreach. Near boundaries in the image the window based approach using matching windows provides for problems. The recovered object boundary often turns out to be displaced in the image.

It has also been proposed to use adaptive windows. Using adaptive windows, however, requires a, usually quite complicated, algorithm to adapt the windows.

A method to reduce the problem of boundary overreach is described in the article "A Simple Stereo Algorithm to Recover Precise Object Boundaries and Smooth Surfaces" by Masatoshi Okutomi et al in Computer Vision and Pattern Recognition 2001, CVPR 2001, Proceedings of the 2001 IEEE Computer Society Conference on Volume 2, 2001, pages II-138 to II-142, vol. 2.

In the known method for each point of the image for which matching is performed a matching window is used wherein the position of the point of interest is scanned over all points of the window. If a matching window is set asymmetrically around a pixel of interest so that the matching window does not to cover the object boundary, boundary overreach does not appear. The pixel of interest is scanned over the total set of matching windows. The total set of matching windows covers a footprint around the pixel of interest.

The known method provides for a solution for the boundary overreach problem. The solution comes, however, at the cost of the need for a large number of computations. Furthermore, another problem occurs: smooth disparity surfaces are destroyed and many stepwise squares are observed in such smooth disparity surfaces. The problems in smooth disparity surfaces are countered in the known method by implementing a boundary detection method and processing the boundary regions differently from the non-boundary regions.

However, the known method requires a large amount of computing power and a rather complex algorithm.

Amongst others, it is an object of the invention to provide a method, which requires relatively less computing power while yet providing relatively reliable and accurate estimates of the depth.

According to the invention a set of fixed matching windows is used for the point of the image, wherein the set of matching windows covers a footprint of pixels around the point of the image, and the average number of windows that a pixel of the footprint belongs to is less than one plus the number of pixels in the footprint divided by 15.

The known method uses rather large windows and a large set of matching windows. Using a large set of windows as proposed in the known method reduces the problem of overreach, but requires large amount of calculation power. The footprint, i.e. all pixels around or near the pixel of interest belonging to at least one matching window is large and also the average number of windows each pixel belongs to is approximately equal to one plus the number of pixels divided by 12.5. This leads to a situation where each pixel in the footprint belongs to a large number of windows. A pixel within the footprint belongs to up to 20-25 windows. The overlap of matching windows is large. This has two detrimental effects, the number of calculations is large and errors are propagated, leading to the effect described in the prior art document.

The inventor has realized that for window-based techniques the proper selection of the windows is important. If the size of the matching window employed is large this may result in blurred depth maps with inaccurate boundaries and a loss of fine details. Using smaller windows on the other hand, while reducing calculating power and being good, would lead to a method prune to noise. Also of importance is the overlap of the matching windows.

In the method in accordance with the invention a set of fixed matching windows are used. Using fixed windows the problems associated with adaptive windows are eliminated.

The set of matching windows determines a footprint around the pixel of interest. The average overlap is smaller, preferably at least twice as small as in the prior art technique. Surprisingly, it has been found that in this case it holds that 'less is better'. By reducing the number of overlap of the matching windows, to at least half of the known method, the number of calculations can be reduced, while the problem of error propagation is also reduced. The windows can be made relatively small thus reducing the need for large calculations.

Preferably the average number of windows that a pixel of the footprint belongs to is less than one plus the number of pixels in the footprint divided by 25. The overlap is than at least twice as small as in the prior art.

Preferably the average number of windows that a pixel of the footprint belongs to is less than one plus the number of pixels in the footprint divided by 50.

The use of small windows, i.e. windows which comprise less than 20, preferably less than 10 pixels that show only a small overlap is preferred.

Because the size of the windows may be made relatively small fine details can be captured.

The method preferably uses a set of matching windows with different orientations, preferably orientations that are substantially perpendicular to each other. Because of the use of matching windows with different orientations the result is several potential matches (and hence disparity values) for each pixel in the depth map, while yet the overlap, because of the different orientations of the matching windows can be kept small. The orientation of a matching window is given by the major and minor axes or the symmetry axes of the matching window.

Due to such a choice of positioning of matching windows there will always or at least very likely always be one matching window for which the boundary overreach does not occur. This redundancy allows for better recovery of details that maybe lost otherwise and also for more confidence in the final disparity estimate. Since the size of the matching windows, as well as the number of matching windows, need not be large the computational burden is low and the task is easily parallelized. Because the windows have only a relatively small overlap, the problem of the prior art, i.e. destruction of smooth disparity surfaces occurs much less. Thus, using a much simpler calculation compared to the known method, it is possible to obtain equally good or even better results. It is remarked that the invention does not mean simply reducing the size of the matching windows disclosed in the prior art document. Important is that the average overlap is reduced, wherein preferably a number of differently oriented matching windows are used. Such use of differently oriented matching windows is not disclosed in the prior art document, which uses identical windows of square shape.

Preferably the matching windows comprise an edge parallel to the orientation of the window wherein the orientation is vertical.

In preferred embodiments the number of matching windows is four and the matching windows form a footprint in the form of a cross. A cross is a simple arrangement, which has shown to give good results.

In another preferred embodiment the number of matching windows is eight, wherein the windows are comprised of two foursomes, one foursome being the left hand or right hand version of the windows in the other foursome, each forming a cross. Using one foursome of matching windows may introduce a slight left to right or right to left bias. By using two foursomes this bias can be eliminated.

In another embodiment the matching windows are substantially triangular.

In a preferred embodiment each window has a size of n1*n2 pixels, wherein n1≧2n2.

Preferably n1 is 1, 2 or 3, most preferably 2 and n2 is 5 to 8.

These and other advantageous aspects of the invention will be described in more detail using the following Figures.

The Figures are not drawn to scale. Generally, identical components are denoted by the same reference numerals in the Figures.

Figure 1:
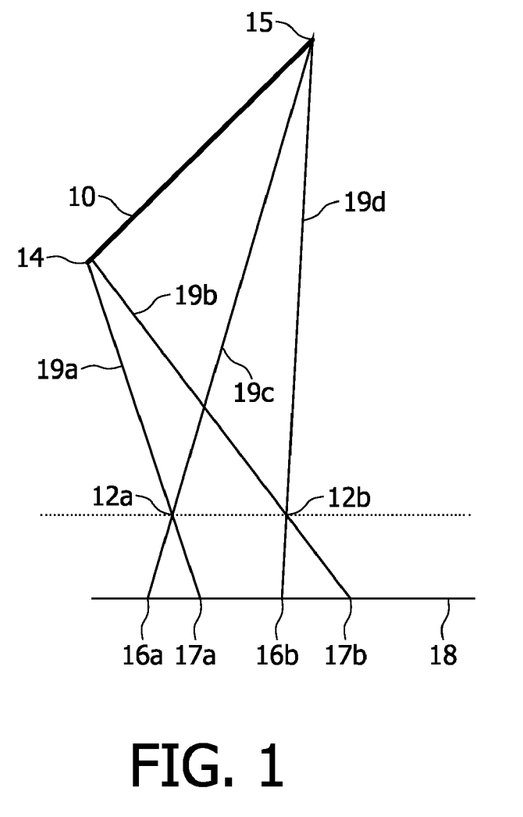
FIG. 1 shows the geometry of part of an image and two orientations

FIG. 1 shows the geometry of a part of an image 10 and two orientations 12a,b. A part of an image may be for instance a person, or any object within the image. The present invention relates to a method for providing a depth map for an image. A depth map can be seen as attributing a z-value, i.e. a depth value, to points of objects. When images of a scene containing the part of an image 10 are obtained using point projection from different orientations 12a,b, the position where points 14, 15 on the part of an image will be visible in the image are projections 16a,b, 17a,b of points 14, 15. The projections can be illustrated by drawing lines 19a-d from the points 14, 15 through the orientations 12a,b to an image plane 18. For setting out the basic principles, the orientations 12a,b have been selected in a plane parallel to the image plane 18, but the invention is not limited to such a selection of orientations 12a,b. The intersections between these lines 19a-d and the image plane 18 illustrate the positions where the points 14, 15 of the part of an image 10 will be visible in images.

It will be noted that a change of viewpoint 12a,b results in a translation of the position 16a,b 17a,b where a point 14, 15 on the part of an image will be visible in the image plane 18. This translation is inversely proportional to the depth "z" between the viewpoint and the point and proportional to the amount of change in the position of the viewpoint. As a result, the translation will be different for points 14, 15 of the part of an image 10 that have different depths "z" from the orientations 12a,b.

Figure 2:
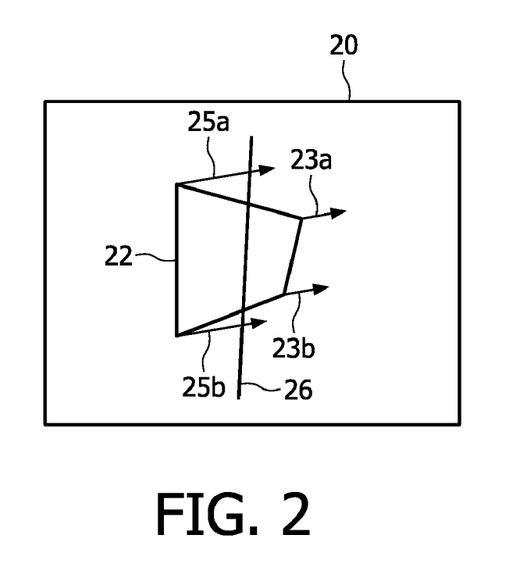
FIG. 2 shows an image of a part of an image

FIG. 2 shows an image 20 containing a region 22 where a part of an image is visible. In the image 20 translation vectors 23a,b, 25a,b are shown by which the positions where points of the part of an image that are visible in the image 20 will be translated in response to a movement of the viewpoint. It will be noted that the translation vectors 25a,b will be larger for points of the part of an image that are closer to the viewpoint than for points that are further from the viewpoint. Along a line 26 where the depth of all points is the same, the translations will be the same.

When one uses a coordinate system having an axis along the line 26 and an axis perpendicular to that line, the amplitude of translation "D" of the position where a point is visible will be proportional to A+Bu, where u is a coordinate of the position where the point is visible along the axis perpendicular to the line 26. The direction of translation is opposite to the direction of movement of the viewpoint. The parameter "A" is proportional to the inverse of the depth "Z0" at u=0: A=c/Z0 and "B" is similarly proportional to that depth and the slope "s" of the part of an image perpendicular to the direction of viewing: B=c*s/Z0 (c is a proportionality constant proportional to the displacement of the viewpoint, the focus distance and the scale of the image). The FIGS. 1 and 2 illustrate a situation wherein two cameras are used. To determine a depth map more than two cameras may be used. Using more than two cameras increases the accuracy and reduces the chance that background objects are occluded by objects in the foreground.

Figure 3:
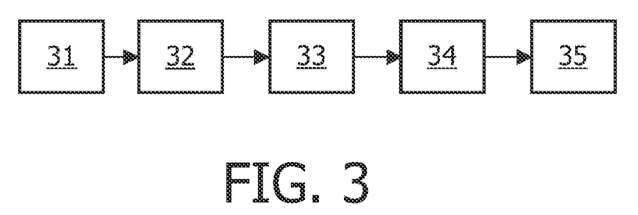
FIG. 3 shows a flow-chart of a method for making a depth map.

FIG. 3 schematically shows a flow-chart of a method for making a depth map for an image or at least for a part of an image.

In a first and second step 31, 32 of the flow chart the camera optics are positioned at a first and second viewpoint respectively, from which a first and second image is obtained respectively.

In a third step 33 of the flow chart a pixel in the first image is selected. In a fourth step 34 for the pixel a best match is found between the images using matching windows.

In step 35 of the flow chart to said pixel a z-value is attributed using the results of step 34, i.e. the best match of the windows. Methods for finding the best match and thereby establishing the z-value may be any method for finding the best z-value using matching windows, which could be, but is not restricted to the calculation method described in the cited article, wherein a minimum SSSD value if calculated. The method in accordance with the invention relates to the choice of matching windows to reduce the problem of boundary overreach common to all methods using matching windows.

These steps are repeated for all or a part of the pixels within the image to obtain a depth map.

Figure 4:
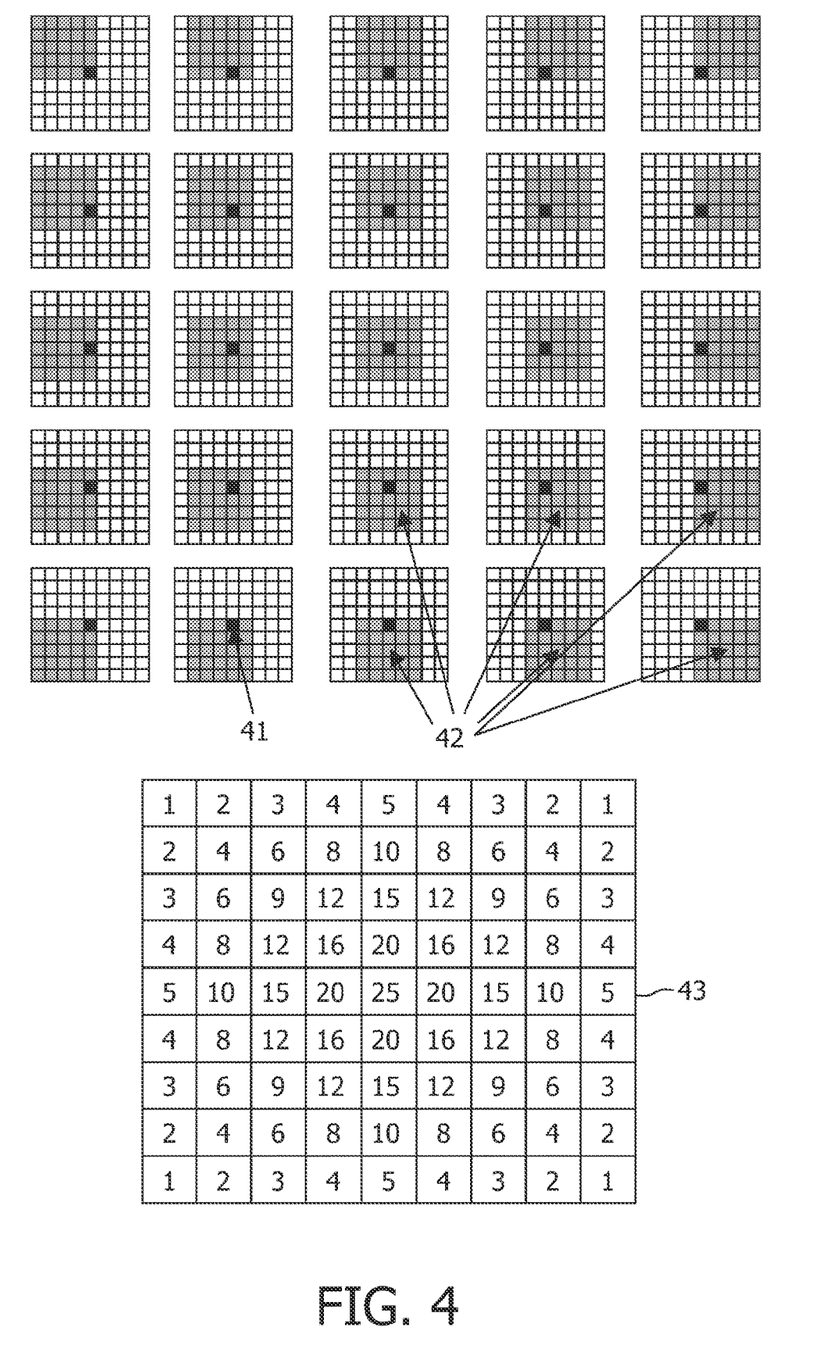
FIG. 4 shows a set of matching windows as used in the prior art.

FIG. 4 illustrates a set of matching windows as described in the cited prior art article. 25 windows are used, each window comprising 25 pixels. The pixel 41 for which the z-value is being determined, called "the point of interest" is represented by the black square. A standard matching window of 5*5 pixels is used and the pixel of interest is scanned over all point of the standard window. This provides 25 matching windows. In FIG. 4 these 25 matching windows are represented by the 5*5 areas of grey squares. Large amounts of calculations will have to be performed. The 25 matching windows span a footprint of 9*9=81 pixels around and including the pixel of interest. The bottom area 43 illustrates those pixels within the larger area of 9*9 pixels, which are common to at least two of the matching windows. This larger area is the footprint of the total set of 25 matching windows. For each pixel of the footprint the number of windows to which each pixel is common is indicated. Most of the pixels are common to more than two (up to 20) of the matching windows. Especially along the vertical and horizontal axes the number is high. The inventors have found that an important parameter is the average number of windows for which a pixel is a common pixel. This average number can be calculated by summing all of the numbers in the footprint and dividing the sum by the number of pixels in the footprint. The prior art gives as an example a footprint of 9*9 pixels with a window of 5*5 pixels. Although the prior art does not disclose a generalization of this scheme, one could imagine the same scheme for larger or smaller footprints, e.g. 11*11 or 7*7 footprints in which case the windows would be 6*6, respectively 4*4 pixels. The known method demands that the pixel of interest is scanned over all pixel of the standard window, thus if one starts with a 4*4 standard window, there will be 16 matching windows, covering a 7*7 footprint, if one starts with a 6*6 standard window, there will be 36 matching window, covering a 11*11 footprint, etc.

The average number of windows that each pixel is common to scan, for the prior art arrangement, be calculated as follows:

Each window (grey areas in the top part of FIG. 4) has m*m pixels where in the example m=5. The number of windows is also m*m, because the pixel of interest is scanned over all pixel of the standard window. So the total number of pixels that are grey for the complete set of matching windows is $m*m*m*m=m^4$. The footprint of all of the set of windows, i.e. the set of pixels that form part of at least one window is n*n where in the example n=9. In fact in the arrangement of the prior art n=2m−1 (or m=0.5(n+1)).

Thus the average number of windows for each pixel is $m^4/n^2$. Each pixel of the footprint is part of at least one window. If a pixel forms a part of more than one window, this may cause problems. An important value, as will be explained below, is the average number of windows for each pixel.

Within the concept of the invention this number is called the average overlap number O.

In formula: $O=m^4/n^2$

Given that n=2m−1 this can be written as:

$O=\frac{1}{16}((n+1)^2/n)^2$

Figure 5:
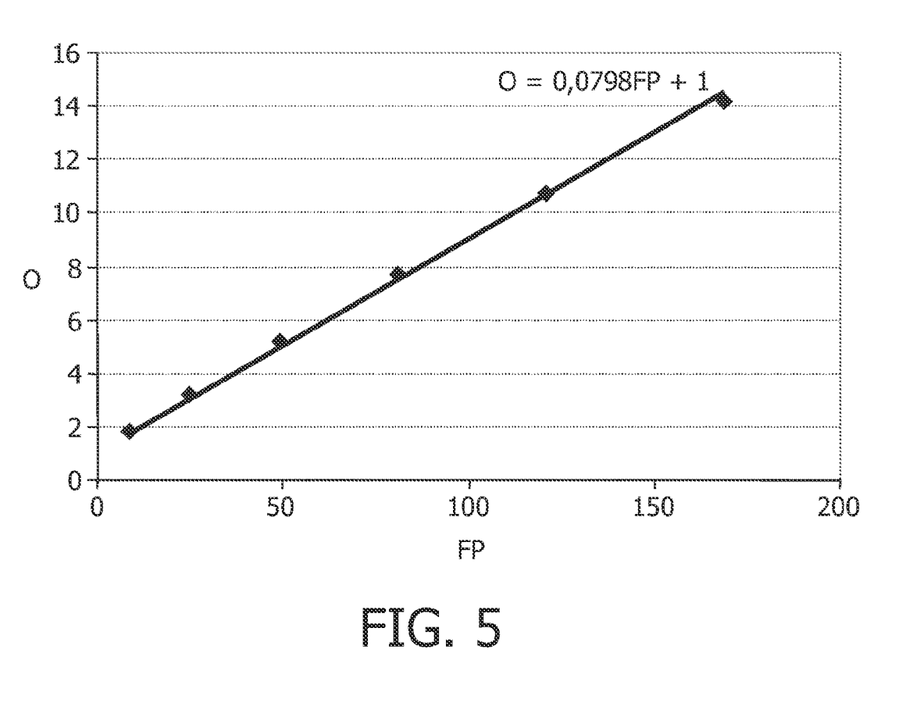
FIG. 5 shows the number of overlap O as a function of the footprint P for the known method.

FIG. 5 gives in a graph, as a number of the footprint, i.e. $n^2$, the value for 0.

For a footprint of 9*9 pixel the value for O is 7.716, i.e. each pixel is, on average, common to 7.716 windows.

O is, at first approximation, a linear function of the footprint of the set of matching windows, i.e. of $n^2$. In first order approximation O is roughly the footprint divided by 12.5 plus 1.

Overlap of matching windows causes a problem namely propagation of errors particularly in smooth disparity surfaces. The more overlap of matching windows there is the larger the problem is. In the known method the problem of destruction of smooth disparity surfaces is resolved by implementing a boundary detection method and processing the boundary regions differently from the non-boundary regions. This, however, requires an additional calculation step. This propagation is larger the larger the value of O−1 is. In the prior art the number O is large and also large along a vertical and horizontal line, which adds to the problem.

Figure 6:
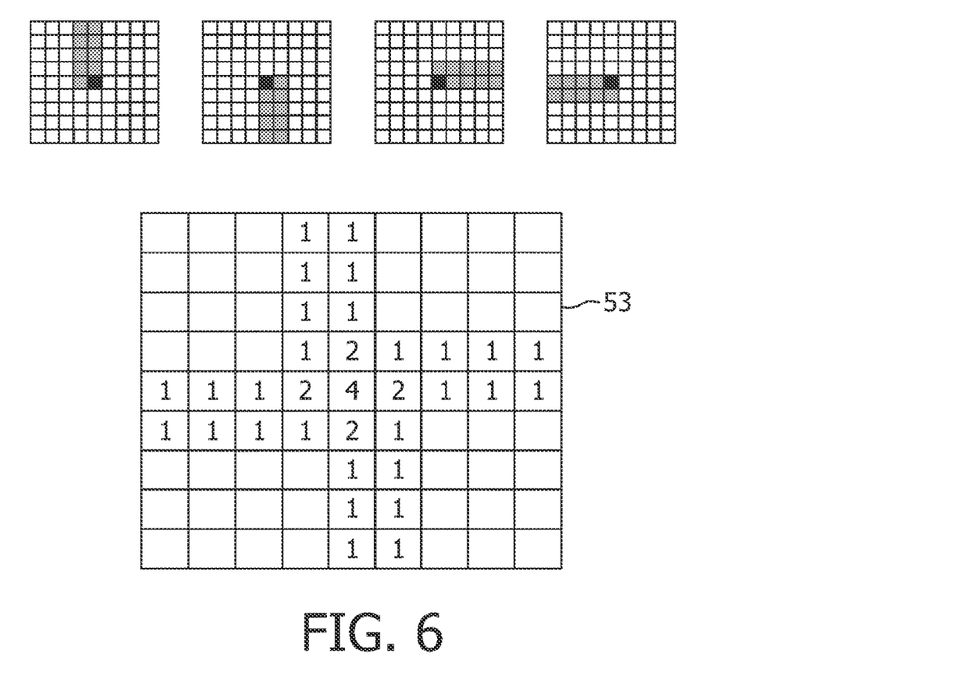
FIGS. 6 to 12 illustrates examples of sets of matching windows for a method and a device in accordance with the invention.

FIG. 6 illustrates a set of matching windows as used in the method and device of the invention. The lower half of the Figure illustrates the footprint and, as in FIG. 4, the number of windows a pixel is common to. The footprint comprises 32 pixels and the average overlap value O=40/32=1.25. This overlap number O is much smaller than the overlap number for the prior art with a comparable footprint, which is approximately 2.5. It is remarked that the problem of destruction of smooth disparity surfaces is likely proportional to the value of O−1, since by definition the minimum value of O is 1. Thus O−1 is the best measure for the overlap of pixels. When we compare O−1, we see an even more striking difference between 0.25 and 1.5, i.e. a factor of 6. In formula the condition of the invention may be expressed as follows:

O<FP/15+1, preferably O<FP/25+1, where FP stands for the number of pixels in the footprint, more preferably O<FP/50+1.

In the prior art it holds O≈FP/12.5+1. By reducing by at least 20%, preferably at least a factor of 2, more preferably by at least a factor of 4, the overlap the problems of the prior art method are reduced.

In the example of FIG. 6 a set of four rectangular 5*2 matching windows is used. The footprint of these matching windows forms a cross. The long axes of the rectangles are oriented along the horizontal and vertical direction.

Figure 7:
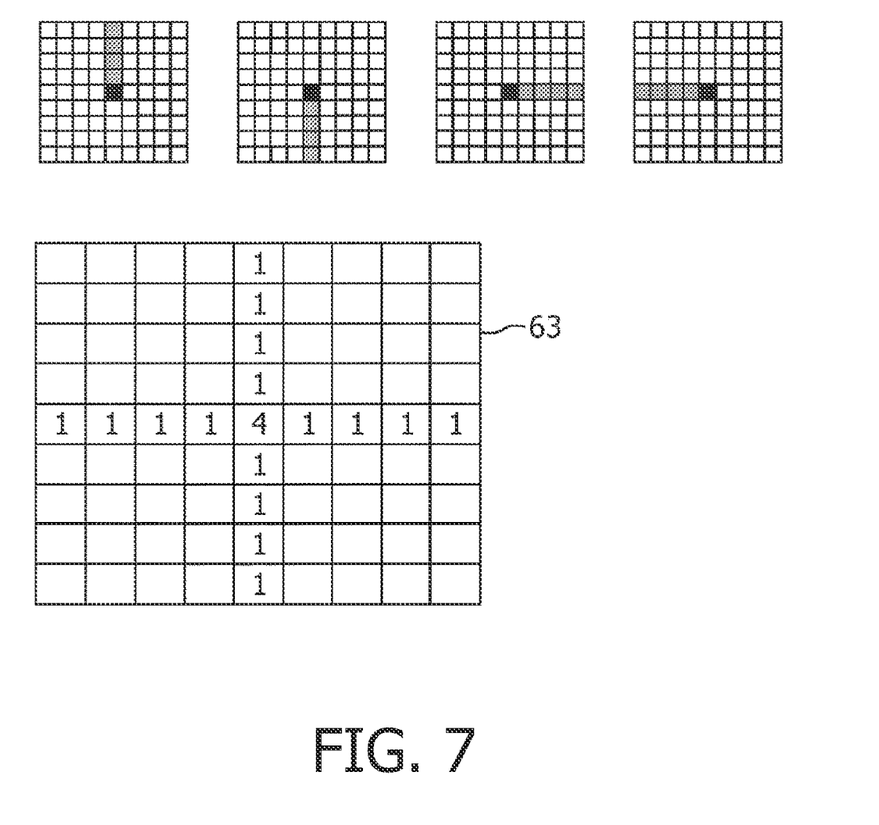

FIG. 7 illustrates a further example of a set of windows. The footprint is relatively small, namely 17 pixels. The number O is 21/17=1.24, much smaller than the value for O for the prior art, which would be approximately 2.36. A set of four rectangular 5*1 matching windows is used. The footprint of these matching windows forms a cross.

Figure 8:
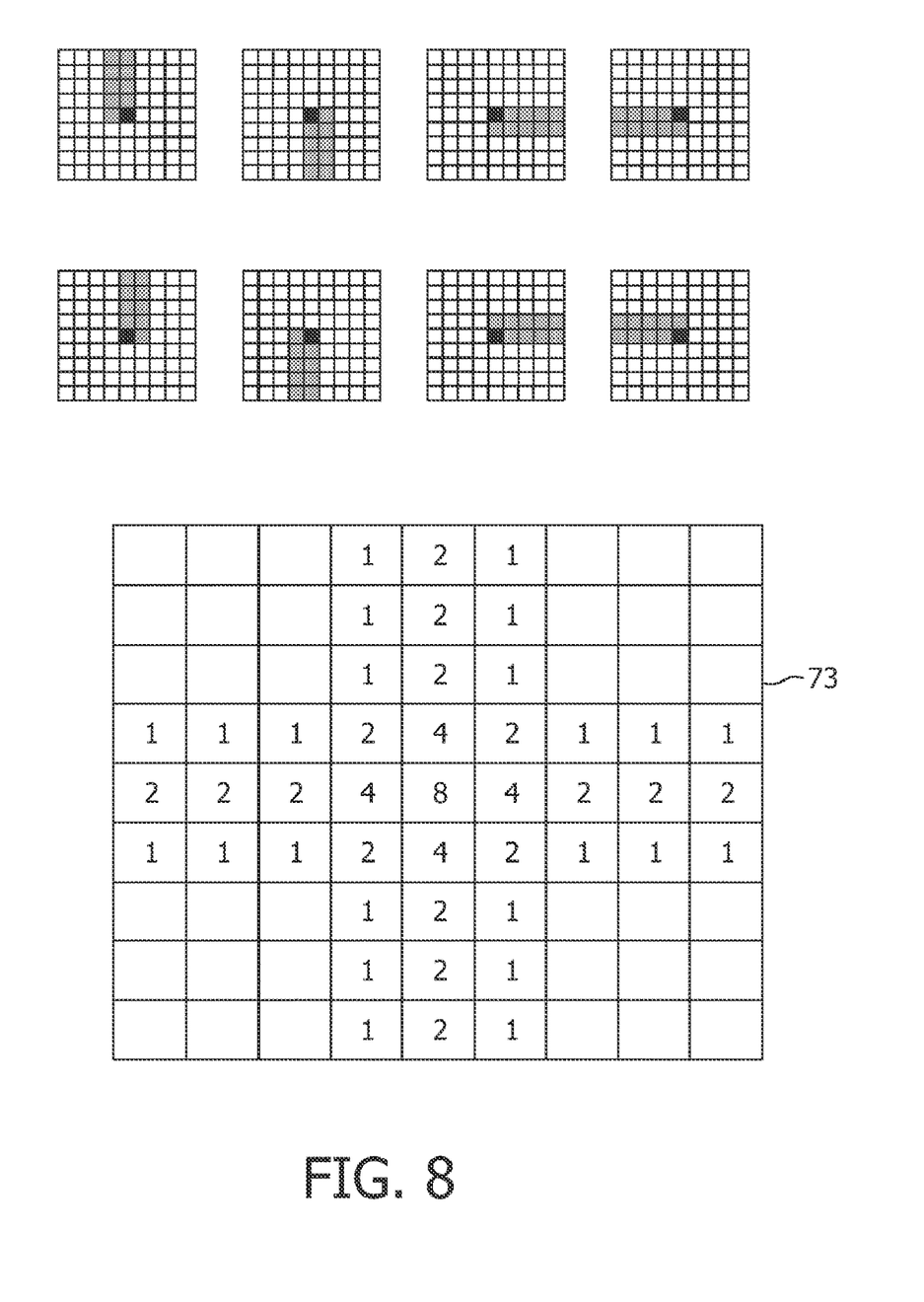

FIG. 8 illustrates yet another example of a set of windows used in a method and device in accordance with the invention. In this case two sets of four matching windows are used. The footprint is 45, the average value O is 80/45−1=0.777 which is far less then the average for an arrangement as known from the prior art for the same footprint, which is roughly 3.6.

Figure 9:
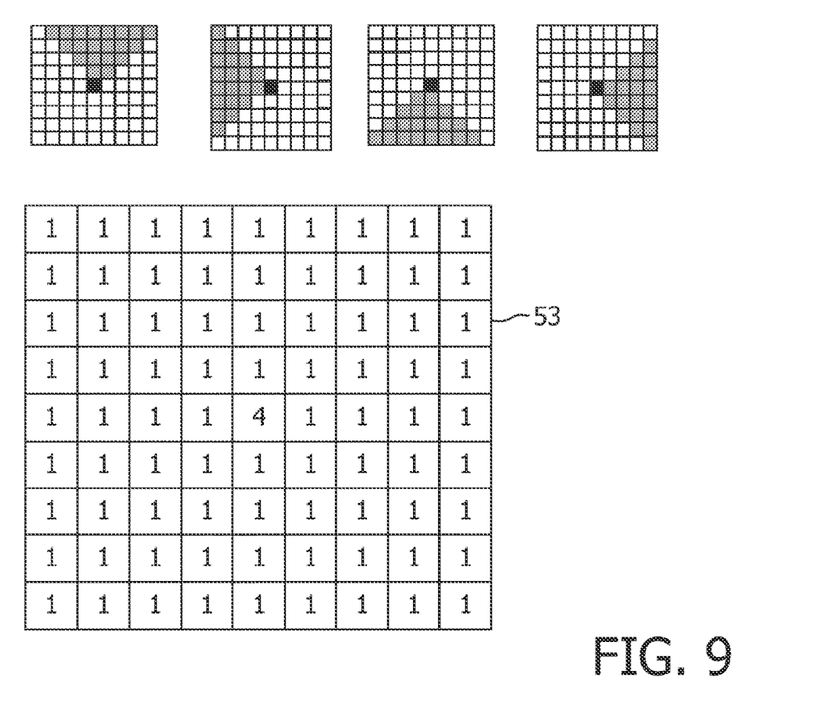

FIG. 9 illustrates yet another example of a set of windows used in a method and device in accordance with the invention. The footprint is 81 pixels, the number for O is 88/81=1.086, far less than the value for the prior art (6.77). In this example a set of 4 triangular matching windows is used. The approximate axes of symmetry of the triangles are oriented along the vertical and horizontal direction.

Figure 10:
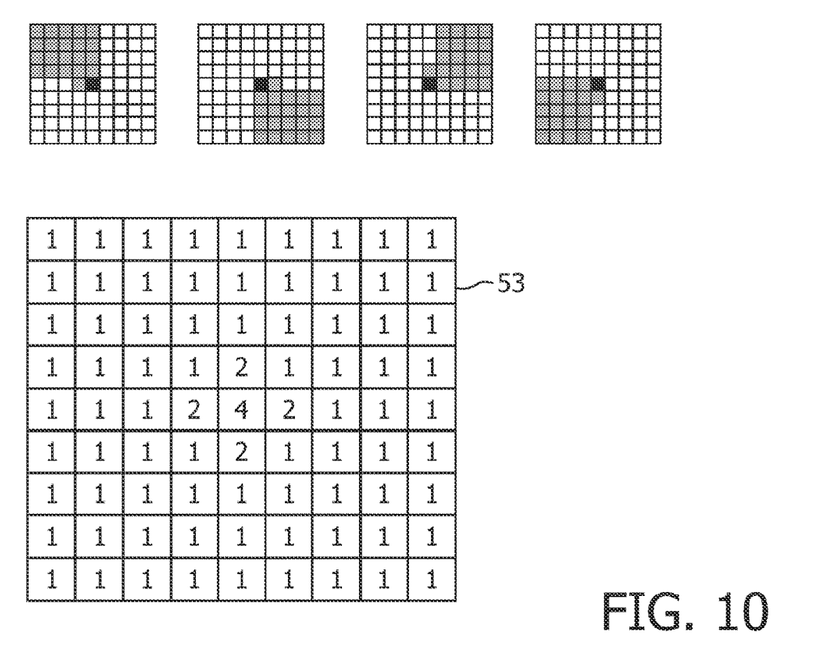

FIG. 10 illustrates yet a further example.

Figure 11:
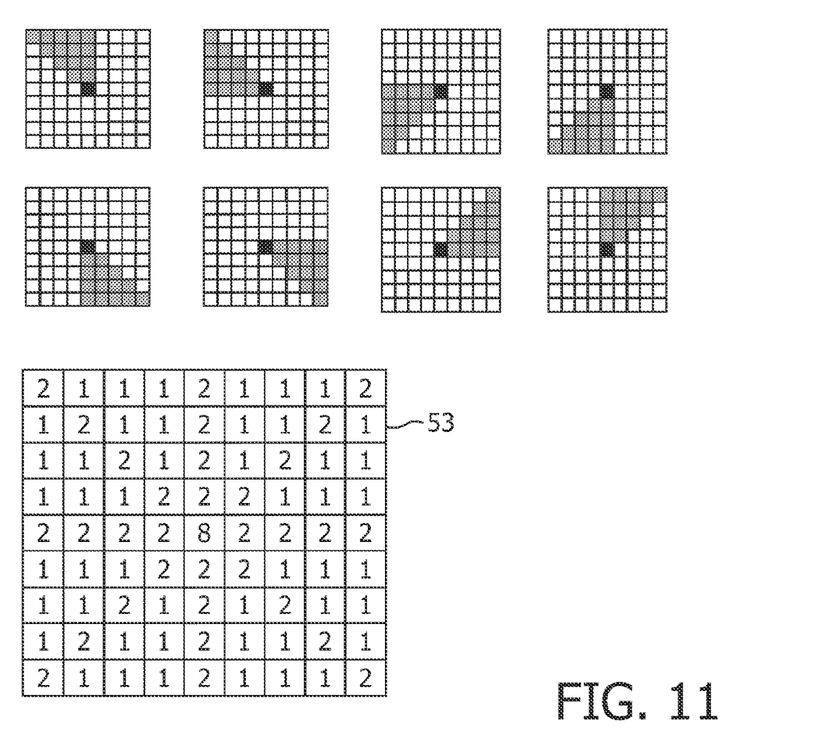

Figure illustrates yet a further embodiment of the invention. In the latter example a set of 8 triangular windows is used. The footprint is 81, the number for O=120/81=1.48.

It is remarked that none of the shown examples of matching windows is square. Although, within the broadest concept of the invention square windows may be used, it is preferred that the matching windows are non-square, since non-square shaped windows such as rectangular or triangular matching windows are more suitable for locking on particular image features such us horizontal and vertical edges (for rectangular matching windows or triangular as shown in FIG. 11) or edges at 45 degrees (for the triangular matching windows).

Preferably the average number of windows that a pixel of the footprint belongs to is less than one plus the number of pixels in the footprint divided by 50. All of the examples given follow this rule. The examples shown in FIGS. 5, 6 and 7 show matching windows of substantially rectangular shape that are oriented perpendicular to each other and form, in combination, a cross-shape. These matching windows, as do the matching windows shown in FIG. 9 show edges along the vertical and horizontal direction. The matching windows shown in FIGS. 5, 6 and 7 have a size of n1*n2 pixels, in the examples having sizes of 5*1 and 5*2 pixels. Such rectangular shaped matching windows, oriented along the vertical and horizontal direction, are most preferred.

Preferably the matching windows have the same shape and form foursomes of shapes, wherein the shape is oriented and wherein the shapes of each matching window is related to the shape of another matching window and may be obtained by a 90, 180 or 270 degree rotation of another one of the matching windows. The sets of FIGS. 6 to 12 show such arrangements, wherein each set of matching windows is derived from one (FIGS. 6, 7, 9 and 10) or two (FIGS. 8, 11) basic oriented forms which are rotated by 90, 180 and 270 degrees to provide the other forms. Such arrangement provides for easy calculations. Preferably a balance is stricken by employing small relatively thin matching windows that are mutually oriented in orthogonal directions to generate disparity candidates.

Figure 12:
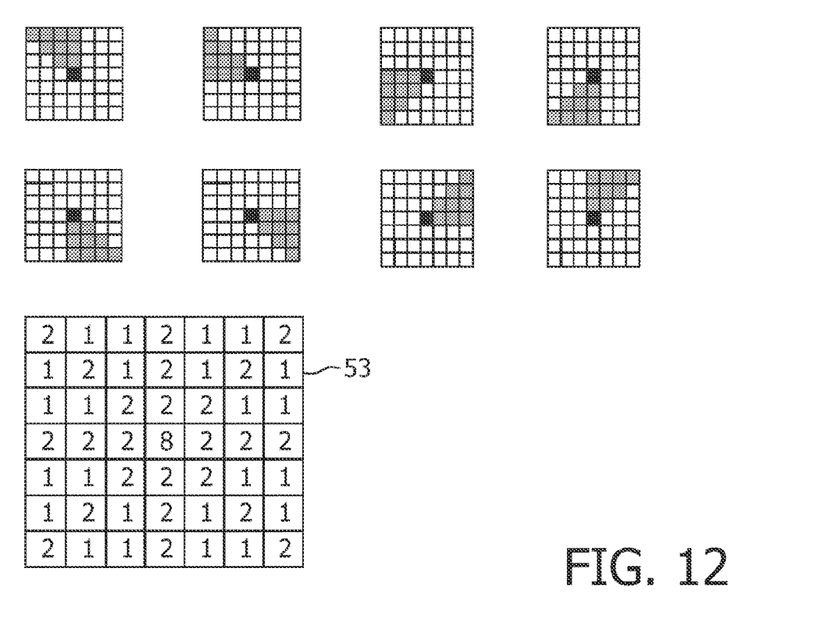

FIG. 12 shows another example of a set of matching windows in accordance with the invention. The footprint in this example is smaller than the footprint as shown in FIG. 11 and is a 7*7 square and O=80/49=1.6.

The footprint could even be further reduced to a 5*5 square, in which case O would be 48/25=1.92, which would just be within the preferred condition of O<F/25+1=2.

A device in accordance with the invention comprises an input for inputting images obtained from different orientations and a determinator for determining a depth map from the images received by the input using window-based matching for a point of the image, wherein in the determinator a set of fixed matching windows is used for the point of the image, wherein the set of matching windows covers a footprint of pixels around the point of the image, and the average number (O) of windows that a pixel of the footprint (FP) belongs to is less than one plus the number of pixels in the footprint divided by 15 (O<FP/15+1), preferably less than one plus the number of pixels in the footprint divided by 25 (O<FP/25+1), even more preferably less than one plus the number of pixels in the footprint divided by 50 (O<FP/50+1).

Figure 13:
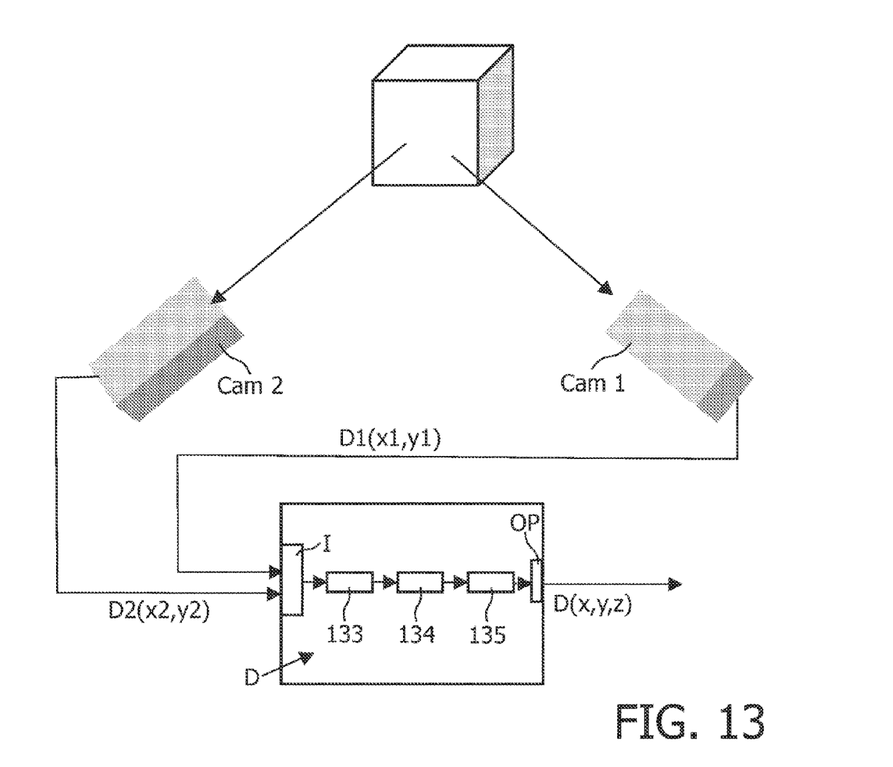
FIGS. 13 and 14 illustrate devices in accordance with the invention.

FIG. 13 illustrates a device in accordance with the invention. Of an object, represented in FIG. 13 by a cube, images are taken by two cameras. In this example two cameras are shown, but the device may comprise more than two cameras. The cameras may record color images, or monochrome images or X-ray images or infrared images. Each of the camera provide two sets of data, wherein each set of data represents a two dimensional image, in the Figure illustrated by D1(x1,y1) and D2(x2,y2), i.e. two two-dimensional data sets. The cameras take the images form different orientations. The device comprises an input I for inputting the images taken from different orientations and a determinator D. Within the determinator D the images are best match using a matching window approach in accordance with the invention. To this end the determinator comprises a selector 133 for selecting a pixel in one of the images D1(x1,y1) or D2(x2,y2). In a matcher 134 for the selected pixel a best match is found between the images using matching windows.

In attributor 135 to said pixel a z-value is attributed using the results of matcher 134, i.e. the best match of the windows. Preferably the data from the cameras comprises data on the mutual orientation of the camera's, the determinator has means to determine the mutual orientation of the camera's or the camera's comprise means to communicate such mutual orientation to the determinator, or the determinator comprises means for inputting such data (for instance by hand), or the set-up of the camera's is fixed so that the mutual orientation is known. Taking of images by the cameras is preferably synchronized. The determinator has an output OP. The output data stream D(x,y,z) is a data stream that comprises both the x and the y coordinate of points, as well as the z-coordinate, i.e. the depth map. This output data stream D(x,y,z) may be sent to a recording device for instance to record the data stream on a DVD data carrier or any other data carrier, or the output data stream D(x,y,z) may be sent to a three-dimensional display device for displaying three dimensional images.

FIG. 13 illustrates a device comprising recording devices such as cameras.

Figure 14:
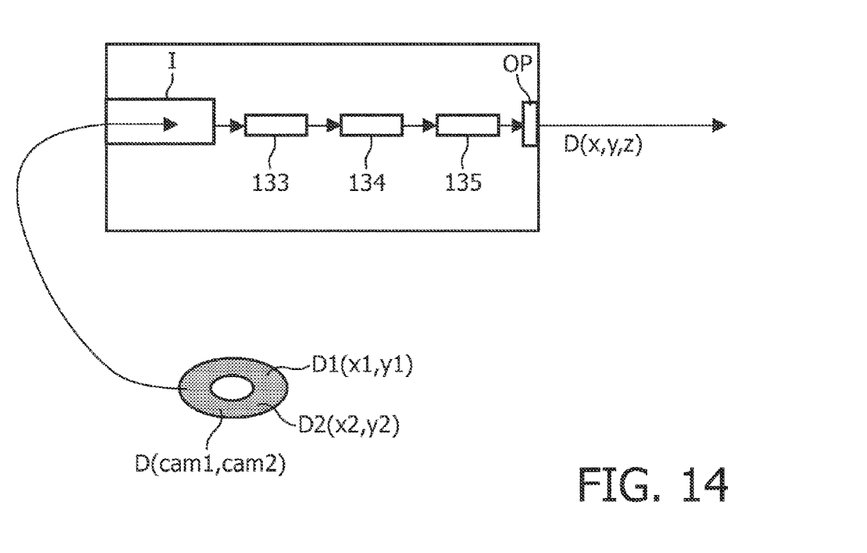

FIG. 14 illustrates a device which has an input for a data carrier, such as for instance a DVD, upon which the data D1(x1,y1) and D2(x2,y2) as well as data on the mutual orientation of the camera's (D(cam1, cam2) are stored. The device in accordance with the invention reads the data and provides an output data stream D(x,y,z).

Preferred embodiments of the device in accordance with the invention comprise means for determining the depth map in accordance with any one or any combination of the above mentioned preferred embodiments of the method, for instance that the average number (O) of windows that a pixel of the footprint (FP) belongs to is less than one plus the number of pixels in the footprint divided by 50 (O<FP/50+1), or that the matching windows or non-square.

A device in accordance with the invention may comprise means for recording images, i.e. the device may include the cameras for taking the images, wherein the cameras send the data on the image to the mentioned input. The device may also receive data from recording devices.

It is remarked that, within the concept of the present invention "determinator", selector, matcher etc. is to be broadly understood and to comprise e.g. any piece of hard ware (such as a determinator), any circuit or sub-circuit designed for performing a determination, selection or matching function as described as well as any piece of soft ware (computer program or sub program or set of computer programs, or program code(s)) designed or programmed to perform a determination, selection or matching operation in accordance with the invention as well as any combination of pieces of hardware and software acting as such, alone or in combination, without being restricted to the below given exemplary embodiments. One program may combine several functions.

In short the invention may be described as follows:

Window based matching is used for determining a depth map from images obtained from different orientations. A set of fixed matching windows is used for points of the image for which the depth is to be determined. The set of matching windows covers a footprint of pixels around the point of the image, and the average number (O) of matching windows that a pixel of the footprint (FP) belongs to is less than one plus the number of pixels in the footprint divided by 15 (O<FP/15+1), preferably less than one plus the number of pixels in the footprint divided by 25 (O<FP/25+1).

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

For instance, the method may de used for only a part of the image, or different embodiments of the method of the invention may be used for different parts of the image, for instance using one embodiment for the center of the image, while using another for the edges of the image.

Use of the verb "to comprise" and its conjugations does not exclude the presence of elements other than those stated in the claims. Use of the article "a" or "an" preceding an element does not exclude the presence of a plurality of such elements.

The invention claimed is:

1. A method for determining a depth map comprising the steps of:
   obtaining images from different orientations using window-based matching for point of the image,
   using a set of fixed matching windows for the point of the image, wherein the set of matching windows covers a footprint of pixels around the point of the image, and the average number (O) of matching windows that a pixel of the footprint (FP) belongs to is less than one plus the number of pixels in the footprint divided by 15 wherein matching windows with different orientations are used and the matching windows are triangular in shape.

2. A method as claimed in claim 1, wherein the average number (O) of windows that a pixel of the footprint belongs to is less than one plus the number of pixels in the footprint divided by 25.

3. A method as claimed in claim 2, wherein the average number (O) of windows that a pixel of the footprint belongs to is less than one plus the number of pixels in the footprint divided by 50.

4. A method as claimed in claim 1, wherein each of the matching windows comprises less than 20 pixels.

5. A method as claimed in claim 4, wherein each of the matching windows comprises less than 10 pixels.

6. A method as claimed in claim 1, wherein the orientations of the matching windows are substantially perpendicular to each other.

7. A device for determining a depth map from images obtained from different orientations using window-based matching for a point of the image wherein the device comprises an input (I) for inputting images (D1(x1,y1), D2(x2, y2)) obtained from different orientations and a determinator (D) for determining a depth map from the images received by the input using window-based matching for a point of the image, wherein the determinator (D) is arranged for using a set of fixed matching windows for the point of the image, wherein the set of matching rindows covers a footprint of pixels around the point of the image, and the average number (O) of matching windows that a pixel of the footprint (FP) belongs to is less than one plus the number of pixels in the footprint divided by 15 and the determinator (D) is arranged for using matching windows with different orientations and the matching windows are triangular in shape.

8. A device as claimed in claim 7, wherein the average number of windows that a pixel of the footprint belongs to is less than one plus the number of pixels in the footprint divided by 25.

9. A device as claimed in claim 8, wherein the average number of windows that a pixel of the footprint belongs to is less than one plus the number of pixels in the footprint divided by 50.

10. A non-transitory computer readable storage medium including a computer program including a set of instructions executable by a processor to determining a depth map from images, the computer readable storage medium comprising code for:
    obtaining images from different orientations using window-based matching for a point of the image,
    using a set of fixed matching windows for the point of the image, wherein the set of matching windows covers a footprint of pixels around the point of the image, and the average number (0) of matching windows that a pixel of the footprint (FP) belongs to is less than one plus the number of pixels in the footprint divided by 15 wherein matching windows with different orientations are used, and the matching windows are triangular in shape.

11. The method as claimed in claim 1, wherein the set of matching windows includes matching windows of the same shape corresponding to a 90, 180 or 270 degree rotation of another one of the matching windows in the set of matching windows.

* * * * *